(12) United States Patent
Kupari et al.

(10) Patent No.: US 9,884,285 B2
(45) Date of Patent: Feb. 6, 2018

(54) METHOD FOR REMOVING DUST AND SULPHUR OXIDES FROM PROCESS GASES

(71) Applicant: OUTOKUMPU OYJ, Espoo (FI)

(72) Inventors: Jari Kupari, Tornio (FI); Pekka Niemelä, Tornio (FI); Eero Väänänen, Tornio (FI)

(73) Assignee: Outokumpu Oyj, Helsinki (FI)

( * ) Notice: Subject to any disclaimer, the term of this patent is extended or adjusted under 35 U.S.C. 154(b) by 0 days.

(21) Appl. No.: 14/912,697

(22) PCT Filed: Aug. 19, 2014

(86) PCT No.: PCT/FI2014/050635
§ 371 (c)(1),
(2) Date: Feb. 18, 2016

(87) PCT Pub. No.: WO2015/025082
PCT Pub. Date: Feb. 26, 2015

(65) Prior Publication Data
US 2016/0193565 A1    Jul. 7, 2016

(30) Foreign Application Priority Data

Aug. 20, 2013   (FI) .................................... 20135847

(51) Int. Cl.
| | | |
|---|---|---|
| *B01D 47/00* | (2006.01) |
| *B01D 53/50* | (2006.01) |
| *B01D 53/78* | (2006.01) |
| *B01D 47/06* | (2006.01) |
| *B01D 47/02* | (2006.01) |

(52) U.S. Cl.
CPC ......... *B01D 53/507* (2013.01); *B01D 47/022* (2013.01); *B01D 47/06* (2013.01); *B01D 53/502* (2013.01); *B01D 53/504* (2013.01); *B01D 2251/304* (2013.01); *B01D 2251/306* (2013.01); *B01D 2251/404* (2013.01); *B01D 2251/60* (2013.01); *B01D 2251/604* (2013.01); *B01D 2252/103* (2013.01); *B01D 2257/302* (2013.01); *B01D 2258/025* (2013.01)

(58) Field of Classification Search
CPC .. B01D 53/1481; B01D 53/50; B01D 53/501; B01D 53/504; B01D 53/78; B01D 2201/48; B01D 2247/00; B01D 2257/302; B01D 2258/025; B01D 47/00
See application file for complete search history.

(56) References Cited

U.S. PATENT DOCUMENTS

| | | | |
|---|---|---|---|
| 3,687,613 A | 8/1972 | Rickard | |
| 3,750,375 A | 8/1973 | Wintrell | |
| 3,795,486 A | 3/1974 | Ekman | |
| 4,322,392 A | 3/1982 | Gleason et al. | |
| 4,436,613 A * | 3/1984 | Sayles | C10G 11/182 208/155 |
| 4,634,582 A * | 1/1987 | Sliger | B01D 53/501 423/242.2 |
| 4,828,482 A * | 5/1989 | Gohara | F23C 10/005 422/142 |
| 4,960,577 A * | 10/1990 | Torbov | B01D 53/501 110/343 |
| 5,000,770 A * | 3/1991 | Ritter | B01D 46/34 55/474 |
| 5,779,999 A | 7/1998 | Laslo | |

FOREIGN PATENT DOCUMENTS

| | | | | |
|---|---|---|---|---|
| CA | 2662882 C | * | 4/2015 | .......... B01D 53/002 |
| GB | 366241 A | | 2/1932 | |
| JP | 2002177723 A | | 6/2002 | |
| WO | 2009153404 A1 | | 12/2009 | |

OTHER PUBLICATIONS

International Search Report prepared by the Finnish Patent and Registration Office for PCT/FI2014/050635, dated Nov. 13, 2014, 4 pages.

* cited by examiner

*Primary Examiner* — Timothy C Vanoy
(74) *Attorney, Agent, or Firm* — Chernoff Vilhauer LLP

(57) ABSTRACT

The invention relates to a method for removing solids in dust and sulphur oxides from process gases generated in a metallurgical process by a wet process. At least part of basic liquid is fed into the gas flow containing solids in at least one cascade scrubber in order to mix basic liquid with the gases and solids to be cleaned at the latest during the wetting of the gases and solids in the water space of the cascade scrubber, and the mixture containing basic liquid, wetted gases and solids are directed to have a cascade shower in each cascade scrubber in order to remove sulphur and solids from the gases.

14 Claims, No Drawings

METHOD FOR REMOVING DUST AND SULPHUR OXIDES FROM PROCESS GASES

CROSS-REFERENCE TO RELATED APPLICATIONS

This is a national stage application filed under 35 USC 371 based on International Application No. PCT/FI2014/050635 filed Aug. 19, 2014 and claims priority under 35 USC 119 of Finnish Patent Application No. 20135847 filed Aug. 20, 2013.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

BRIEF SUMMARY OF THE INVENTION

BRIEF DESCRIPTION OF THE SEVERAL VIEWS OF THE DRAWINGS

Not applicable.

DETAILED DESCRIPTION OF THE INVENTION

This invention relates to a method for removing solids in dust and sulphur oxides from process gases generated in a metallurgical process by a wet process. The method is carried out in at least one cascade scrubber.

The U.S. Pat. No. 3,795,486 relates to a web scrubber system which is efficient in removal of contaminant particles and gaseous contaminants from industrial gases. The scrubbing liquor is cascaded downwards through a series of successive scrubbing zones or stages. A plurality of elements is employing in horizontal arrays for providing impingement surfaces for disbursing and deflecting the downwards cascading scrubbing liquor moving toward the lower end of the scrubber counter to the direction of upward gas flow. Liquor of this U.S. Pat. No. 3,795,486 comprises water and/or a mixture of water and limestone in a slurry which cascades downwardly onto the element in each successive lower scrubbing zone while the gas on the other hand flows upwards in a counter direction through the scrubber housing. With the scrubbing liquor comprising a wet limestone slurry a reaction is obtained with the oxides of sulphur in the gas forming calcium sulphite and/or calcium sulphates. The scrubbing liquor can also comprise mixtures of water and magnesium hydroxide or sodium hydroxide or ammonium hydroxide. The material precipitated out of the gas flow eventually moves to the lower end of the housing in a collection sump below the gas inlet. The concentrated material thus removed leaves the gas in a clean condition substantially free of sulphur dioxide and particulates and the gas pass out via the outlet at the upper end of the housing.

According to the U.S. Pat. No. 4,322,392 sulphur dioxide is scrubbed from boiler flue gases in an alkali scrubber consisting of a quencher loop and an absorption loop in order to control recycled water from dewatering system. The gas flow is first quenched in the quench loop with water containing alkali, calcium carbonate $CaCO_3$, and then scrubbed in the second loop with a second water slurry, isolated from the first water slurry and containing alkali in sulphur dioxide absorber. The recycled water is controlled by separating the water slurry discharged from the gas sulphur dioxide absorber into a low solids overflow and a high solids overflow in a liquid-solids concentrator. The scrubbed gas flow is passed through a demister and the demister is washed with water and this wash water is added to the discharge liquid from the scrubber in the second loop.

The U.S. Pat. No. 5,779,999 relates to gas-liquid contactors that use an alkaline slurry to remove acidic gases from utility and industrial combustion gases where oxidation of the cleansing fluid yields a precipitate that can be disposed or recycled. The oxygen-containing gas is injected into the tank so as to the alkali-containing fluid to flow up through a first region structurally delineated with the tank and down into a second region structurally delineated with the tank and so to oxidize the alkali-containing fluid with the first region prior to flowing into the second region.

The U.S. Pat. No. 3,687,613 describes a method and apparatus for preparing an additive for use in reacting with sulphur-bearing flue gases in a wet scrubber. The additive in the solid state is delivered to an entrainment chamber and entrained in a confined stream of flue gas passed there through and further conducted to a slurry make-up area where it is directed into contact with water to wet and disentrain the additive. This disentrained additive is collected as a slurry and introduced to the wet scrubber. Precalcining of the additive permits it to more readily dissolve in water and to react at a more rapid rate with the gaseous sulphur compounds.

These prior art publications are concentrated to treat the alkali-containing slurry in the scrubbers, but these publications do not describe an effective cascade operation. Further, when utilizing an alkali-bearing additive in the scrubbing process of sulphur-bearing gases the treatment of the alkali additive requires additional process steps before and after the removal of the sulphur-bearing material from the gases.

The object of the present invention is to eliminate some drawbacks of the prior art and to achieve an improved method for removing solids in dust and sulphur oxides from process gases generated in a metallurgical process by a wet process feeding basic liquid into at least one cascade scrubber.

In the method according to the invention sulphur oxides and solids in dust bearing flue gases from a metallurgical process are treated by feeding basic liquid, such as water, into at least one cascade scrubber before the cascade scrubbing operation in each cascade scrubber. According to one embodiment of the invention at least part of basic liquid is fed directly into the gas flow containing solids to be cleaned before the gas flow is conducted into the cascade scrubber operation. According to another embodiment of the invention at least part of basic liquid is fed into the gas flow to be cleaned in a water space of the cascade scrubber. In accordance with the invention the method is carried out in connection with a sintering process, but the method can be utilized also in connection with other metallurgical processes.

The method according to the invention is preferably applied in a cascade scrubber, which contains as the main parts a central part, such as a central tube, a scrubber part, such as a scrubber tube, and a deflector. Even though the cascade scrubber applied in the method according to the invention is described herewith having essentially a cylindrical cross-section of the main parts, at least a part of the main parts in the cascade scrubber for the invention can also have a rectangular or even polygonal cross-section. The main cascade scrubber parts are positioned inside a housing, which contains at least one inlet and at least one outlet for gases, at least one inlet and at least one outlet for washing water, at least one outlet for the precipitate achieved from solids coming in within gases and at least one inlet for basic liquid. In the housing it is essentially separated an impingement zone, a scrubber zone and a cascade shower zone in order to have an effective cascade operation. A central tube at its lower part is coaxially installed at least partly inside a scrubber tube. The diameter of the scrubber tube in the vicinity of its end surrounding the central tube is advantageously narrowed towards to the external surface of the central tube to have advantageous flow conditions for cascading. The part of the central tube positioning outside the cascade tube is provided with a plate-like object surrounding outside the central tube in order to operate as a deflector to make possible effectively a cascade shower in the scrubber. It is also advantageous to shape the lower end of the scrubber tube with a conical part to have an improved effect for the pressure conditions in the scrubber tube.

In the method of the invention sulphur oxide containing gases and dust containing solids to be cleaned in the cascade scrubber are fed in the cascade scrubber through the gas inlet in the housing towards to the upper part of the central tube. Basic liquid for cleaning gases and dust containing solids is fed into the central tube provided with at least one inlet for the basic liquid. The scrubber tube has a water space which is filled with washing water essentially at least close to the same level as the end of the central tube positioned inside the scrubber tube. Basic liquid is at least partly sprayed into the central tube above the water surface level in the water space of the scrubber tube or at least to the same level as the end of the central tube, and at least partly below the water surface level to the water space of of the scrubber tube. It is also possible that basic liquid is only fed into the central tube above the water surface level in the water space of the scrubber tube, or that basic liquid is fed only into the water space of the scrubber tube below the water surface level in the water space of the scrubber tube. The gases and dust to be cleaned and basic liquid are mixed advantageously together at least partly, before the gases, dust and basic liquid are mixed with the washing water in the water space of the scrubber tube. The wet gases are then directed towards the walls of the scrubber tube and flow in the scrubbing zone to the upper end of the scrubber tube positioned advantageously coaxially with the central tube. The wet gases flow out of the scrubber tube through the narrowed end of the scrubber tube upwards to the plate-like object, to the deflector, surrounding outside the central tube. The plate-like object, the deflector, causes the wet gases to flow downwards as a cascade shower. By means of the cascade shower the sulphur and solids in the dust are finally removed from the gases, and the cleaned gases flow towards to the gas outlet in the upper part of the housing, while the sulphur and solids separated from gases flow downwards to the outlet for solids in the lower part of the housing.

According to the invention the basic liquid is fed into the central tube of a cascade scrubber in order to mix with the gases and dust to be cleaned at the latest during the wetting of the gases and dust, and the mixture containing basic liquid, wetted gases and dust are directed to have a cascade shower in order remove sulphur and solids from the gases.

According to the method of the invention the basic liquid is adjusted to the pH range of 8-14, preferably 11.5-12.5. The pH adjustment is achieved by additions of lime products, such as hydrated lime or basic slag, or lye into the washing liquid. As basic liquid it is also possible to use a liquid which is circulated as basic off-liquid from other processes. The feed of additives or the feed of basic off-liquid needed are controlled by pH measurements or analyzing of sulphur oxide content in the cleaned gas.

The basic liquid according to the invention is fed into scrubbing through at least one inlet in the housing and further through at least one inlet in the central tube. Advantageously the central tube is provided with a plurality of inlets for basic liquid. In case of a plurality of inlets in the central tube the inlets are positioned advantageously at the same level and symmetrically to each other in a desired distance to each other in the wall of the central tube. It is also possible that the inlets in the central tube are positioned in at least two levels in the wall of the central tube. The inlet for basic liquid in the central tube is advantageously provided with a nozzle in order to cause a strong flow through the inlet towards gases to be cleaned. The use of a nozzle causes more speed for the basic liquid flow and thus gives more reaction time and reaction surface area for the removal of sulphur and solids compared to water feed into the process. It is also possible that washing of the gases and solids in dust is intensified by compressed air which is fed into the lower part of the water space of the scrubber tube.

According to the invention at least part of the inlets for basic liquid in the central tube are positioned above the water surface level in the scrubber tube in order to feed basic liquid into the gas and dust flow before the gas and dust flow has a contact with the washing water. In case when basic liquid flows through the inlet positioned above the water surface level, the basic liquid is advantageously fed in the atmospheric pressure, but it is also possible to use a compressed basic liquid. In case when basic liquid flows through the inlet positioned below the washing water surface level, the basic liquid is preferably fed compressed in order to have a good contact with the gases and dust to be cleaned, but it is also possible to use a atmospheric basic liquid. It is also possible to arrange so that a part of basic liquid is fed into the gas and dust flow through the inlets positioned above the surface level of the washing water and a part of basic liquid is fed into the gas and dust flow through the inlets positioned below the surface level of the washing water.

Even though it is described that a housing contains one cascade scrubber it is possible to enlarge the housing, in which case one housing can have more than one cascade scrubber. Then the cascade scrubbers have a common housing surrounding the scrubbers and the cascade scrubbers have at least one common inlet and outlet for gases and dust, at least one common inlet for basic liquid and at least one common outlet for washing water and solids.

SEQUENCE LISTING

Not Applicable.

The invention claimed is:

1. Method for removing solids and sulphur oxides from process gases generated in connection with a metallurgical sintering process by a wet process, the method comprising:
   receiving process gases to be cleaned, which process gases are generated in connection with the metallurgical sintering process;
   feeding the process gases into a cascade scrubber;
   at least partially mixing basic liquid with the process gases, then wetting the mixture by mixing the basic liquid and the gases with washing water in the water space of the cascade scrubber; and
   directing the mixture containing basic liquid, wetted process gases and solids to have a cascade shower in each cascade scrubber to remove sulphur and solids from the gases.

2. Method according to the claim 1, characterized in that the pH value of the basic liquid is between 8 and 14.

3. Method according to the claim 2, characterized in that the pH value of the basic liquid is between 11.5-12.5.

4. Method according to the claim 1, characterized in that the basic liquid is fed above a water surface level in the water space of a scrubber tube portion of the cascade scrubber.

5. Method according to claim 1, characterized in that the basic liquid is fed below a water surface level in a water space of the scrubber tube portion of the cascade scrubber.

6. Method according to claim 1, characterized in that the basic liquid is fed partly above a water surface level in the water space of a scrubber tube portion of the cascade scrubber and partly below the water surface level in in the water space of the scrubber tube.

7. Method according to claim 1, characterized in that the basic liquid, in atmospheric pressure, is fed into the process gases to be cleaned.

8. Method according to claim 1, characterized in that the basic liquid, such that the basic liquid is compressed, is fed into the process gases to be cleaned.

9. Method for removing solids in dust and sulphur oxides from process gases generated in connection with a metallurgical sintering process by a wet process, the method comprising:
   receiving process gases to be cleaned, which process gases are generated in connection with the metallurgical sintering process;
   feeding the process gases into a cascade scrubber;
   at least partially mixing basic liquid with the process gases, then wetting the mixture by mixing the basic liquid and the gases with washing water in the water space of the cascade scrubber; and
   directing the mixture containing basic liquid, wetted process gases and solids to have a cascade shower in each cascade scrubber to remove sulphur and solids from the gases; and
   feeding compressed air into in the lower part of the water space of the cascade scrubber.

10. Method according to claim 1, characterized in that the basic liquid comprises water.

11. Method according to claim 1, characterized in that the basic liquid is circulated as basic off-liquid and is obtained from other processes.

12. Method according to the claim 11, characterized in that the basic liquid comprises basic slag.

13. Method according to claim 1, characterized in that the basic liquid comprises hydrated lime.

14. Method according to claim 1, characterized in that the basic liquid comprises lye.

* * * * *

UNITED STATES PATENT AND TRADEMARK OFFICE
CERTIFICATE OF CORRECTION

PATENT NO.        : 9,884,285 B2
APPLICATION NO.   : 14/912697
DATED             : February 6, 2018
INVENTOR(S)       : Jari Kupari It is certified that error appears in the above-identified patent and that said Letters Patent is hereby corrected as shown below:

In the Specification

| | |
|---|---|
| Column 1, Line 36 | "BACKGROUND OF THE INVENTION" should be located at Column 1, Line 46 |
| Column 1, Line 38 | "BRIEF SUMMARY OF THE INVENTION" should be located at Column 2, Line 54 |
| Column 1, Line 45 | "DETAILED DESCRIPTION OF THE INVENTION" should be located at Column 2, Line 60 |
| Column 3, Line 50 | "...to the water space of of the scrubber tube..." should be --... to the water space of the scrubber tube...-- |
| Column 4, Line 11 | "...in order remove sulphur and solids..." should be --...in order to remove sulphur and solids...-- |

In the Claims

| | |
|---|---|
| Column 5, Line 30 Claim 6 | "...and partly below the water surface level in in the..." should be --...and partly below the water surface level in the...-- |
| Column 6, Line 21 Claim 9 | "feeding compressed air into in the lower part of the water..." should be --feeding compressed air into the lower part of the water...-- |

Signed and Sealed this
Twenty-second Day of May, 2018

Andrei Iancu
*Director of the United States Patent and Trademark Office*